Oct. 12, 1943.                J. L. BAGGETT                2,331,367
                           PREPARATION OF FORMALS
                            Filed April 17, 1941
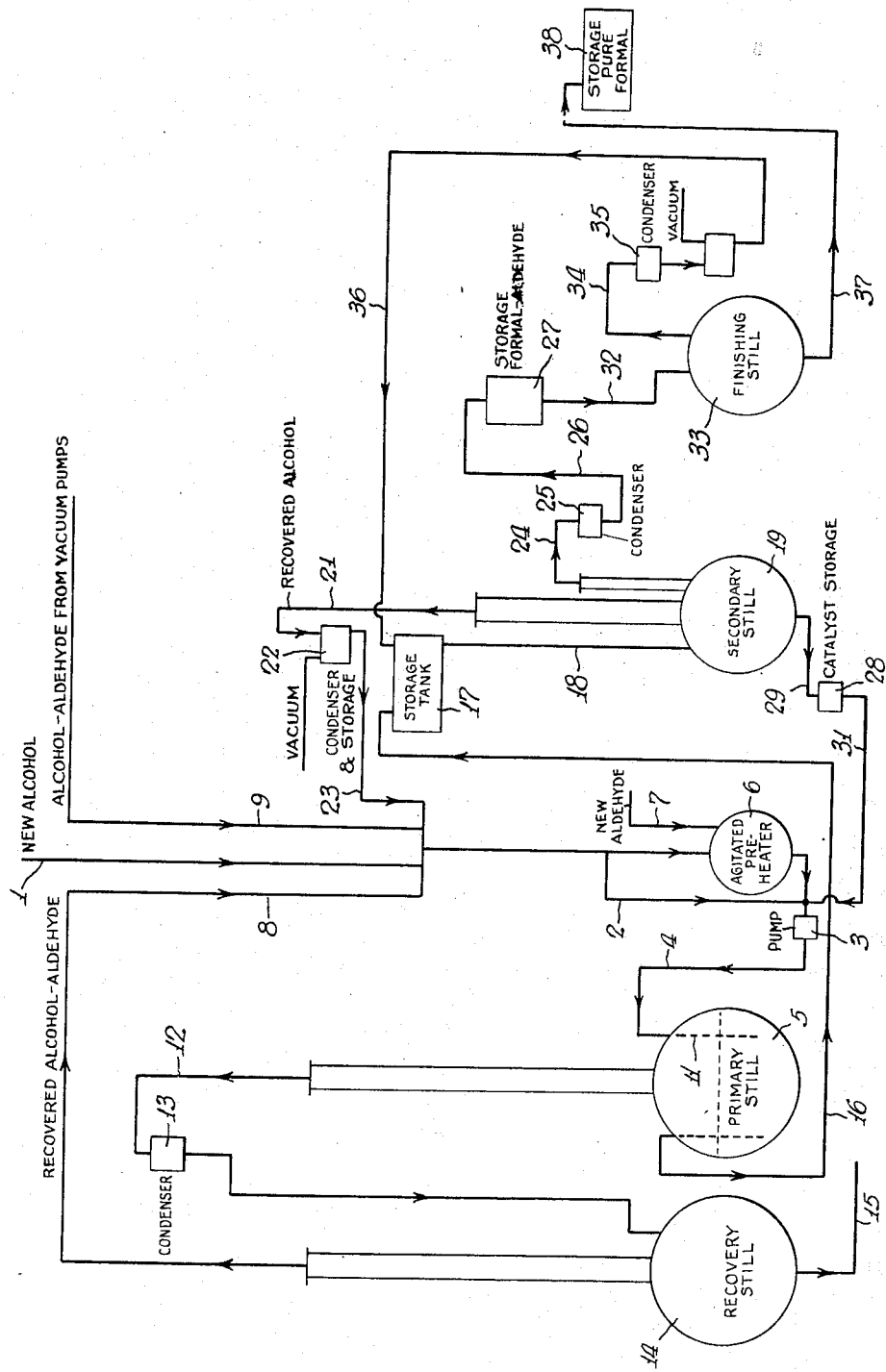
INVENTOR
John L. Baggett

UNITED STATES PATENT OFFICE 2,331,367

PREPARATION OF FORMALS

John L. Baggett, Cumberland, Md., assignor to Celanese Corporation of America, a corporation of Delaware Application April 17, 1941, Serial No. 389,017

5 Claims. (Cl. 260—615)

This invention relates to a process for preparing condensation products of aldehydes such as formaldehyde, paraformaldehyde, acetaldehyde or benzaldehyde with aliphatic hydroxy compounds such as polyhydric alcohols, partial ethers of polyhydric alcohols, or aliphatic hydroxy carboxylic acid, which condensation products are herein termed "formals." More specifically, this invention relates to a process for preparing pure formals by a particular sequence of steps.

An object of this invention is the economic and expeditious production of a substantially pure formal by reacting an aldehyde with an aliphatic hydroxy compound. Another object of this invention is the provision of an improved method of producing formals whereby there is obtained an ultimate yield of above 98% of the theoretical. Other objects of the invention will appear from the following detailed description and drawing.

Although this invention is applicable, by obvious modification, to the production of any formal, i. e., the condensation product of an aldehyde with an aliphatic hydroxy compound, it will be described more particularly in connection with the condensation product of paraformaldehyde with ethylene glycol mono-methyl ether. In this condensation, about two molecular parts of ethylene glycol mono-methyl ether are reacted with one molecular part of paraformaldehyde, with or without a suitable catalyst such as sulphuric acid or hydrochloric acid, in accordance with the following reaction:

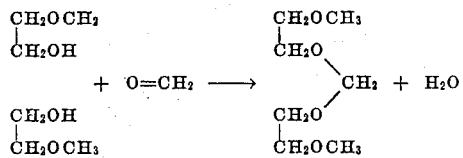

Preferably, a catalyst such as sulphuric acid, in a quantity of at least 0.05% by weight, should be present.

In carrying out the above reaction in accordance with prior processes, very poor yields were obtained. In fact, the yields were seldom above 40% of the theoretical. However, by employing the process of this invention, yields of above 70% of formal are obtained while all the unreacted compounds are returned to the cycle in such a manner that the efficiency of the process is above 98%. Another advantage of this process over those employed prior to this invention is the comparatively small amount of unreacted aldehyde circulating through the system or leaving the reaction zone. If the aldehyde leaves the reaction zone unreacted it is irretrievably lost because it cannot economically be separated from the water formed in the reaction. This invention reduces the amount of aldehyde needed by 25% over prior methods. By employing this invention no excess of aldehyde is needed as was necessary in prior processes.

My invention, in one of its aspects, comprises preparing a slurry of 3 molecular parts of ethylene glycol mono-methyl ether and 1 molecular part of paraformaldehyde (or 3 molecular parts of formaldehyde). This slurry is added in at least five decrements to a still containing 3 molecular parts of ethylene glycol mono-methyl ether, together with 0.1% by weight of sulphuric acid as catalyst, which has been raised to reaction temperature. The slurry is fed to the still at a point substantially below the surface of the liquid in the still, each decrement being added only after the reaction of the previous decrement has stopped and the temperature of the mass in the still is brought to above the reaction temperature. The number of decrements may be increased above 5 by reducing the interval between them.

The process of my invention is illustrated by the accompanying drawing, and by the following specific example which is given merely by way of illustration and is not to be considered limitative.

Example

Ethylene glycol mono-methyl ether is blown in from an outside storage tank into two measuring tanks. One tank is filled to hold about 700 pounds and the other about 800 pounds. The 700 pounds of ethylene glycol mono-methyl ether are added directly to a still where 1 pound of sulphuric acid is mixed with it. In the still the ethylene glycol monomethyl ether is heated to its boiling point. 50 pounds of paraformaldehyde are mixed with enough ethylene glycol monomethyl ether (approximately 200 pounds) from the 800 pound tank to form a smooth, freely running slurry. This slurry is then introduced into the still through a dip pipe arranged so that the paraformaldehyde-ethylene glycol mono-methyl ether slurry enters at least 2 feet below the surface of the liquid in the still. When the slurry is added the reaction goes rapidly and the still temperature may drop 5 to 15 degrees before again rising to the boiling temperature. When there is no further reaction and the temperature is raised to the boiling point, a second decrement of slurry is introduced and so on until the 200 pounds of paraformaldehyde and the 800 pounds of ethylene glycol mono-methyl ether are added. Each successive charge of slurry should be smaller than the preceding charge. For instance, the charges may be as follows:

| Charge | Weight | Consist of charge | |
|---|---|---|---|
| | | Paraformaldehyde | Ethylene glycol mono-methyl ether |
| | *Lbs.* | *Lbs.* | *Lbs.* |
| 1st | 250 | 50 | 200 |
| 2nd | 225 | 45 | 180 |
| 3rd | 200 | 40 | 160 |
| 4th | 175 | 35 | 140 |
| 5th | 125 | 25 | 100 |
| 6th | 75 | 15 | 60 |
| 7th | 50 | 10 | 40 |

The introduction of the reactants in this manner uses up substantially all the paraformaldehyde and only a negligible excess is needed such that recovery of unreacted paraformaldehyde is made unnecessary.

When the batch is completed the crude formal is pumped to storage or smaller stills, wherein, under vacuum and fractionation, excess ethylene glycol mono-methyl ether is removed leaving the formal and catalyst which are then separated by fractioning off the formal.

The layout of the plant for producing pure formals in accordance with my invention will now be described in connection with the accompanying drawing. The plant layout is designed primarily for the production of the formal of mono-methyl ether of ethylene glycol. It is to be understood, however, that modification and rearrangement of the layout may be made without departing from the spirit of the invention.

New ethylene glycol mono-methyl ether from a suitable source is introduced into the system through a line or conduit 1 about one-half of the initial amount introduced passing through conduit 2 to a pump 3 which pumps the ethylene glycol mono-methyl ether through conduit 4 into primary still 5. The other approximate half of the ethylene glycol mono-methyl ether is passed into an agitated preheater 6 into which is also passed new paraformaldehyde through a conduit 7 together with (after the system gets going) recovered ethylene glycol mono-methyl ether and paraformaldehyde from conduits 8 and 9. In the preheater 6 there is made a slurry, as above stated, of the ethylene glycol mono-methyl ether and the paraformaldehyde which is forced by the pump 3 through the line 4 into the still 5. Each batch of this slurry is preferably less than the immediately preceding bath and it is introduced into the still 5 through a dip tube 11 in such a manner that it enters the still under a substantial layer of the fluid therein.

After all the decrements of slurry have been added and the reaction is carried to completion the liquid in the still is raised to a temperature above the boiling point of the ethylene glycol mono-methyl ether and refluxed such that any unreacted ethylene glycol mono-methyl ether, paraformaldehyde and the water formed during the reaction is carried by conduit 12 to condenser 13 to a recovery still 14. In the recovery still 14 the ethylene glycol mono-methyl ether and paraformaldehyde are refluxed off from the water and returned to the system through the conduit 8 while the water is drained from the system through conduit 15. The remaining liquid in the primary still 5 is then blown through conduit 16 to a suitable storage tank 17 from which it is fed through conduit 18 to a secondary still 19. In the secondary still 19 the material is further refluxed to remove the last traces of ethylene glycol mono-methyl ether which is carried through the line 21 to a condenser and storage 22 to be fed back into the system through line 23.

After removal of the ethylene glycol mono-methyl ether by the secondary still 19 the temperature of the still is then raised such that the formal produced and the trace of paraformaldehyde are carried by the conduit 24 to the condenser 25 and then through the conduit 26 to a storage tank 27. The residue of the secondary still 19 contains the catalyst. The catalyst is returned to the catalyst storage 28 through conduit 29 from which it may be reintroduced into the system through the conduit 31.

The formal containing a trace of paraformaldehyde which is in the storage tank 27 is carried by conduit 32 to a finishing still 33, where the last trace of paraformaldehyde is removed, through the conduit 34, condenser 35 and then back to the storage tank 17 through the conduit 36. The finished pure formal then remaining in the finishing still 33 is blown through the conduit 37 to suitable storage tank or mixing apparatus 38.

The pure formal may be mixed with suitable oils, such as olive oil, castor oil, cotton seed oil, peanut oil, mineral oil or oxidized vegetable or mineral oils or mixtures of the same to form finishing materials for artificial threads and filaments.

It is to be understood that the foregoing detailed description is merely given by way of illustration and that many variations may be made therein without departing from the spirit of my invention.

Having described my invention, what I desire to secure by Letters Patent is:

1. In a process for the production of a formal by condensation of an aldehyde with an aliphatic hydroxy compound selected from the group consisting of polyhydric alcohols, partial ethers of polyhydric alcohol and aliphatic hydroxy carboxylic acids, the steps of introducing a plurality of decrements of a mixture of aldehyde and aliphatic hydroxy compound under a substantial layer of aliphatic hydroxy compound and catalyst heated to above the reaction temperature and allowing the reaction of each decrement to go to completion before introducing the next decrement.

2. In a process for the production of a formal by condensation of an aldehyde with an aliphatic hydroxy compound selected from the group consisting of polyhydric alcohols, partial ethers of polyhydric alcohol and aliphatic hydroxy carboxylic acids, the steps of introducing a plurality of decrements of a slurry of equal molecular parts of the aliphatic hydroxy compound and an aldehyde calculated as formaldehyde under a substantial layer of aliphatic hydroxy compound and catalyst heated to above the reaction temperature and allowing the reaction of each decrement to go to completion before introducing the next decrement.

3. In a process for the production of a formal of mono-methyl ether of ethylene glycol, the steps of introducing a plurality of decrements of a slurry of about equal molecular parts of mono-methyl ether of ethylene glycol and paraformaldehyde calculated as formaldehyde under a substantial layer of mono-methyl ether of ethylene glycol and sulphuric acid as catalyst heated to above the reaction temperature and allowing the reaction of each decrement to go to completion before introducing the next decrement.

4. In a process for the production of a formal by condensation of formaldehyde with mono-methyl ether of ethylene glycol, the steps of introducing a plurality of decrements of a mixture of paraformaldehyde and mono-methyl ether of ethylene glycol under a substantial layer of mono-methyl ether of ethylene glycol and catalyst heated to above the reaction temperature and allowing the reaction of each decrement to go to completion before introducing the next decrement.

5. In a process for the production of a formal by condensation of formaldehyde with mono-methyl ether of ethylene glycol, the steps of introducing a plurality of decrements of a slurry of equal molecular parts of the mono-methyl ether of ethylene glycol and paraformaldehyde calculated as formaldehyde under a substantial layer of mono-methyl ether of ethylene glycol and catalyst heated to above the reaction temperature and allowing the reaction of each decrement to go to completion before introducing the next decrement.

JOHN L. BAGGETT.